United States Patent [19]

Manning

[11] Patent Number: 5,372,314

[45] Date of Patent: Dec. 13, 1994

[54] METHOD OF MANUFACTURING WASTE ABSORBENT MATERIAL

[75] Inventor: Harold J. Manning, Pasco, Wash.

[73] Assignee: CERAD Industries, Inc., Oklahoma City, Okla.

[21] Appl. No.: 131,492

[22] Filed: Oct. 4, 1993

[51] Int. Cl.$^5$ .......................... B02C 1/00; B02C 11/08
[52] U.S. Cl. ...................................... 241/21; 241/17; 241/23; 241/28
[58] Field of Search ...................... 241/17, 21, 23, 28

[56] References Cited

U.S. PATENT DOCUMENTS

| | | | |
|---|---|---|---|
| 4,187,141 | 2/1980 | Ahrel | 241/28 X |
| 5,028,299 | 7/1991 | Guidat et al. | 241/28 X |
| 5,087,400 | 2/1992 | Theuveny | 241/28 X |

Primary Examiner—Timothy V. Eley
Attorney, Agent, or Firm—Head & Johnson

[57] ABSTRACT

A method of manufacturing animal bedding material in which waste cellulosic fibrous material, such as waste paper, is finely shredded after which any metal component is removed and the shredded material is then thoroughly mixed with calcium oxide and water until a temperature of the mixture of about 120° F. to 140° F. is achieved after which the mixture is neutralized with silica diatomite plankton or non-swelling clay in a ratio to obtain a final mixture having a neutral pH and drying the final mixture to obtain a product useful for bedding for animals.

6 Claims, 1 Drawing Sheet

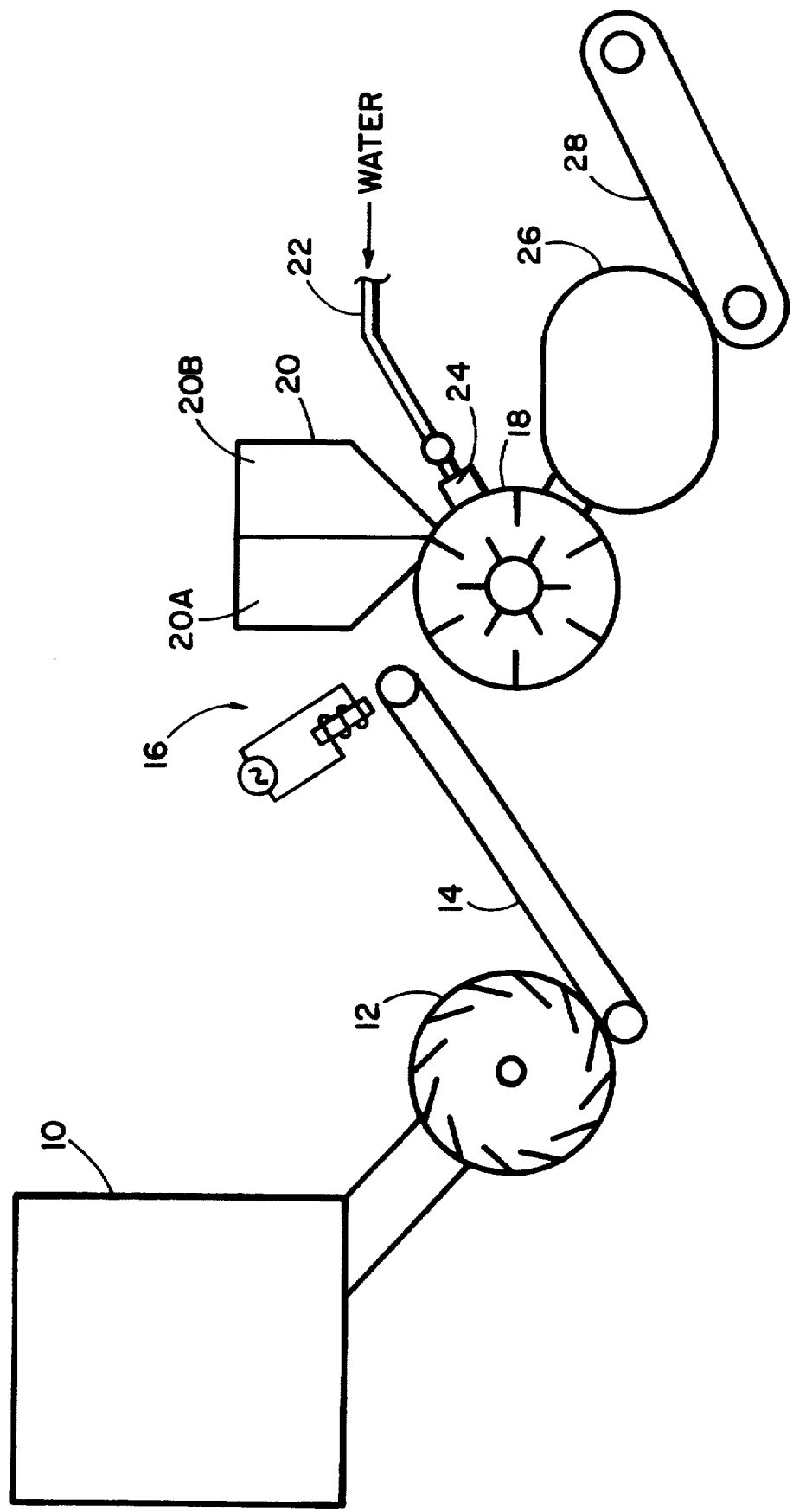

METHOD OF MANUFACTURING WASTE ABSORBENT MATERIAL

BACKGROUND OF THE INVENTION

The most commonly used materials for animal bedding are wood shavings and straw. Sometimes hay is substituted for straw. These materials, especially wood shavings, have very little ability to absorb moisture or animal waste and contribute nothing toward pest control. Further, after these materials have been utilized for bedding, such as in a horse stable, cow barn, or the like, they are extremely bulky and create a serious bulk handling and disposal problem. In addition, while the use of wood shavings and straw employ natural, biodegradable products, the biodegradability is relatively slow and the biodegraded products contribute little to soil character or fertility.

For these reasons, there exists a need for improved animal bedding material that makes use of readily available raw materials. Particularly, there is a need for an animal bedding material that can be made employing a product that within itself constitutes a waste disposable problem, that is, waste paper. Further, there is a need for an animal bedding material that is highly water absorbent, that is helpful in reducing insects and odors, and when fully utilized is of substantially less bulk than wood shavings and straw. Even more important, a need exists for an animal bedding material that, when used, can be disposed of on land for use in improving the texture and the fertility of the land.

SUMMARY OF THE INVENTION

This invention provides a method of making highly effective animal bedding material employing readily available waste components and other inexpensive and readily available materials. The animal bedding material is manufactured employing steps as follows:

(1) Waste cellulosic fibrous material, such as waste paper, cardboard or so forth, is finely shredded to obtain a shredded fiber. In a preferred practice of the invention, the material, such as waste paper, is shredded to a size wherein the shredded components are of about 2 to 3 centimeters in the longest direction.

(2) The finely shredded cellulosic fibrous material is passed through a separator wherein any metal components are removed. The metal extraction step is accomplished utilizing a magnetic separator—a process well known in the industry.

(3) The demetalled shredded fiber of step (2) is then thoroughly mixed with calcium oxide and water until a temperature of 120° F. through 140° F. is achieved to obtain a first mixture that is in the form of a slurry.

(4) The first mixture slurry is then thoroughly mixed with a neutralizing material which can be either silica diatomite plankton (diatomaceous earth) or a non-swelling clay. The neutralizing material is mixed at a ratio of about 30% of dry weight to the weight of the first mixture slurry. The neutralizing material is preferably utilized in sufficient quantity so that the final mixture or slurry has a neutral pH of about 7.

(5) The final neutralized slurry is then dried to obtain the animal bedding material. The bedding material may be stored and shipped in bulk, such for use in horse stables and racing barns or cow barns, or packaged, such as for use for small animal bedding, such as for dogs or cats. The material may also be beneficially employed in the bottom of bird cages or any other facility where animals are kept and where animal urine or droppings are likely to occur.

Diatomaceous silica has previously been used for forming insecticidal compositions such as revealed in U.S. Pat. No. 4,279,895 issued to Arthur Carle entitled "Insecticidal Natural Bait Composition And Method Of Using Same". Further, the use of diatomaceous earth in poultry feed is disclosed in U.S. Pat. No. 3,271,161 issued Sep. 6, 1966 to John C. Eshleman entitled "Poultry Feed Containing About 1% Diatomaceous Each".

A better understanding of the invention will be obtained from the following description, taken in conjunction with the attached drawing.

DESCRIPTION OF THE DRAWING

The drawing illustrates diagrammatically the sequence of steps employed in the present method of this invention for manufacturing animal bedding material.

DESCRIPTION OF THE PREFERRED EMBODIMENT

Referring to the drawing, the element number 10 indicates a source of waste cellulosic fibrous material that can be in the form of waste paper or waste cardboard, or any similar inexpensive source of cellulosic fibrous material. A serious problem in the world today is the disposal of waste paper and waste cardboard. Some of such waste materials are recycled for the use in making recycled paper. However, such processes are not highly economical, and today only a relatively small percent of waste paper or waste cardboard is processed in a manner to be recycled for making new paper or new cardboard. The method of this invention makes good use of such readily available waste paper and waste cardboard.

A further problem that exists today with waste paper and waste cardboard is that the material is difficult to dispose of. If placed in large quantities in landfills, it degrades very, very slowly especially if disposed of in normal compacted form. The expense of shredding waste paper prior to disposal in a landfill has been too expensive to make it economically feasible to require all waste paper and waste cardboard to be shredded before disposal and even if shredded, the shredded material becomes highly compacted and if covered with earth, it biodegrades very slowly. Thus, the method of this invention not only takes advantage of the inexpensive source of raw material represented lay waste paper or waste cardboard but provides a good use for such waste products and for ultimate disposal of such products in environmentally acceptable forms.

The waste fibrous material from source 10 is conveyed to a shredder 12 wherein the material is finely shredded. Industrial waste paper shredders are commercially available. In the preferred practice of the invention, the waste fibrous material should be shredded so that the particle size of the shredded material on the average has a maximum dimension of about 30 centimeters.

The shredded material is fed to a conveyor 14, or other similar device, where it is carried to a magnetic separator station, indicated generally by the numeral 16, wherein any metal component of the finely shredded cellulosic fibrous material is removed. The demetalled shredded fiber is deposited from convey 14 into a reactor 18. In reactor 18 calcium oxide from a first portion 20A of a feeder 20 is mixed with the cellulosic fibrous material. Water from a source 22 is fed into reactor 18 in conjunction with a moisture controlled apparatus 24. The water, calcium oxide and the shredded cellulosic material are thoroughly mixed within reactor 18 until a temperature of about 120° F. to 140° F. is achieved. The reaction of the calcium oxide with the shredded cellulosic material is exothermic so that the desired temperature can be achieved without the addition of heat to the reactor.

After the reaction of the calcium oxide and shredded cellulosic material has been carried out sufficiently to obtain the desired temperature and to obtain a first mixture slurry, there is added thereto from portion 20B of feeder 20 a neutralizing material which can be either silica diatomic plankton, also referred to as diatomaceous earth, or a non-swelling clay. This neutralizing material is added to the slurry within reactor 18 until the slurry is neutralized to a pH of about 7 so that therefore the final mixture is neither acidic or basic.

The neutralized material from reactor 18 is then passed to a dryer 26 wherein moisture is removed so that the finished material is fluffy and dry to the touch and does not adhere to itself when compacted in sealed enclosures. The dried and fluffed material is then passed to a conveyor 28 where it can be passed for storage or packaging. When the material is to be used in bulk quantities it can be shipped in bulk containers, such as to horse barns at race tracks or breeding farms or to cow barns or the like. When the material is to be used for small domestic animals, such as dogs, cats, it can be packaged in bags for easy storage, handling and distribution.

The animal bedding material thus described is economical to manufacturer. Further, the completed animal bedding material of this invention after being used as bedding material and after having absorbed quantities of animal urine and droppings can be easily disposed of since the material is not as bulky and heavy as used wood shavings or used straw and can be placed directly upon land where it functions not only as a fertilizer as a consequence of the components added by the animal urine and droppings but also where it functions to improve soil texture achieved by the biodegradable cellulosic material and diatomaceous earth. Further the calcium oxide portion of the waste material is considered beneficial to the soil.

If plankton or diatomaceous material from fresh water sources are used, no salt or any other salinity results in the finished material.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A method of manufacturing waste absorbent material comprising the following steps:
   (1) finely shredding waste cellulosic fibrous material, to obtain shredded fiber;
   (2) passing the shredded fiber from step (1) through a metal separator wherein any metal component in the shredded fiber is removed to obtain demetalled shredded fiber;
   (3) thoroughly mixing the demetalled shredded fiber of step (1) with calcium oxide and water until a temperature of the mixture of about 120° F. to 140° F. is achieved to obtain a first mixture slurry;
   (4) thoroughly mixing a neutralizing material selected from the group comprising silica diatomite plankton and non-swelling clay with the first mixture from step (3) in a ratio to obtain a final mixture having a neutral pH of about 7; and
   (5) drying said final mixture from step (4) to obtain animal bedding material.

2. A method of manufacturing animal bedding material according to claim 1 wherein step (1) includes shredding waste cellulosic fibrous material to a size of about 2 to 3 centimeters.

3. A method of manufacturing animal bedding material according to claim 1 wherein step (3) include mixing calcium oxide at a rate of about 5 to 6% by weight of the weight of demetalled shredded fiber.

4. A method of manufacturing animal bedding according to claim 3 wherein the ratio by weight of water in said first mixture is about 10 to 12% by weight.

5. A method of manufacturing animal bedding material according to claim 1 wherein said neutralizing material is added to said first mixture at a ratio of about 30 to 60% of the initial dry weight.

6. A method of manufacturing animal bedding material according to claim 1 wherein the moisture content in the material at the conclusion of step 5 is about 12 to 14% by dry weight.

* * * * *